United States Patent [19]

Di Ruocco et al.

[11] Patent Number: 5,290,831
[45] Date of Patent: Mar. 1, 1994

[54] MULTICOMPONENT ADHESIVE COMPOSITION

[75] Inventors: Vittorio Di Ruocco; Fabio Garbassi, both of Novara, Italy

[73] Assignee: Ministero Dell'Universita e Della Ricerca Scientifica e Tecnologica, Rome, Italy

[21] Appl. No.: 872,408

[22] Filed: Apr. 23, 1992

[30] Foreign Application Priority Data

Apr. 30, 1991 [IT] Italy ................. MI 91 A 001188

[51] Int. Cl.$^5$ .............................. C09J 105/16
[52] U.S. Cl. ...................... 524/48; 524/533; 524/536
[58] Field of Search ................ 524/48, 533, 536

[56] References Cited

U.S. PATENT DOCUMENTS

| 3,591,438 | 7/1971 | Toback et al. | 526/320 |
| 3,962,372 | 6/1976 | Arhart | 525/301 |

FOREIGN PATENT DOCUMENTS

| 0334376A2 | 9/1989 | European Pat. Off. . |
| 0334377A2 | 9/1989 | European Pat. Off. . |
| 0334378A2 | 9/1989 | European Pat. Off. . |
| 0411951A1 | 2/1991 | European Pat. Off. . |
| 0441690A2 | 8/1991 | European Pat. Off. . |
| 1091637 | 11/1967 | United Kingdom . |

OTHER PUBLICATIONS

*Hawley's Condensed Chemical Dictionary* edited by Sax et al., Eleventh Ed., Van Nostrand Reinhold, New York, pp. 356, 370 and 371 (1987).

Primary Examiner—Joseph L. Schofer
Assistant Examiner—R. H. Del Mendo
Attorney, Agent, or Firm—Oblon, Spivak, McClelland, Maier & Neustadt

[57] ABSTRACT

A multicomponent adhesive composition of:
(A) an elastomer dissolved in a polymerizable acrylic component;
(B) a polymerization starter selected from peroxides, hydroperoxides, peracids, peresters, oxaziridines and fluorinated oxaziridines;
(C) a starter-activating agent; and
(D) a starter stabilizing agent selected from cyclodextrins, calyxarenes and cavitands.

16 Claims, No Drawings

MULTICOMPONENT ADHESIVE COMPOSITION

FIELD OF THE INVENTION

The invention relates to a multicomponent adhesive composition; in particular the invention relates to an adhesive composition of the acrylic type.

BACKGROUND OF THE INVENTION

The use of structural adhesives has undergone a substantial increase in the last years, mainly in the aerospace and automotive sectors, with the consequent development of new high-performance adhesive systems. The use of structural adhesives in said sectors has facilitated the replacement of the conventional metallic materials with polymeric materials; furthermore, the generation and development of the class of the structural acrylic adhesives has permitted their application also on non-pretreated surfaces, or even not perfectly clean surfaces, without affecting too much the adhesive performances. The structural acrylic adhesives generally consist of a mixture of acrylic polymers, which polymerize according to a radical mechanism. They exhibit mechanical properties comparable with the ones of the epoxide adhesives, with the advantage of a much shorter setting time, a higher shear and unpact strength and the possibility of realizing resistant joints, even with not very clean surfaces.

Since the acrylic matrices are brittle after cross-linking, the addition of an elastomer to the formulation increases the tenacity thereof; the mechanical properties of the brittle polymers can be inproved, in fact, by incorporating, into the matrix, particles of an elastomeric phase, the presence of which increases the tenacity of the material.

U.S. Pat. No. 3,591,438 describes a two-component composition, in which the adhesive component consists of an acrylic ester, containing a peroxide (as a polymerization starter), and a starter activating agent, consisting of a mixture based on aldehyde-amine condensation products, optionally combined with metal salts. U.S. Pat. No. 3,642,750 describes a sealing composition comprising an acrylic ester, a monovalent cycloaliphatic alcohol and an organic peroxide; another sealing composition is described in U.S. Pat. No. 3,203,941 and is composed of tetraethylene glycol dimethacrylate, of a polyaminic compound and of an organic acid.

In all the cases considered by the prior art, the main components of the adhesive compositions are: a) a sulphur-containing elastomer, selected from chlorosulphonated polyethylene and the mixtures of sulphuryl chloride with chlorinated polyethylene; b) a polymerizable vinyl monomer; c) an organic peroxide as a starter.

Said compositions are not fully free from drawbacks; in fact they exhibit, for example, a low pot life. Furthermore, during their preparation (on an industrial scale )considerable amounts of peroxides or hydroperoxides are to be handled, which, if not handled with the utmost care, can lead to explosions, particularly if the temperature rises. Lastly, the tendency of the peroxides to decompose reduces their capacity of starting the polymerization reaction. U.S. Pat. No. 4,447,588 radically eliminates such problems by utilizing (instead of the peroxides) compounds based on triazine, which are by far stabler than the peroxides or hydroperoxides; said triazinic compounds, however, are difficult to be found and/or synthesized.

SUMMARY OF THE INVENTION

The Applicant has now disclosed that the above mentioned drawbacks can be drastically reduced by new multicomponent structural adhesives having a higher pot life, an excellent setting time and a total absence of hazard connected with the handling of hydroperoxides, peroxides or other similar starters.

In its broadest aspect the invention relates to a multicomponent adhesive composition comprising:

(A) an elastomer dissolved in a polymerizable acrylic monomer;
(B) a polymerization starter selected from peroxides, hydroperoxides, peracids, peresters, oxaziridines and fluorinated oxaziridines;
(C) a starter-activating agent; and
(D) a starter-stabilizing agent selected from cyclodextrins, calyxarenes and cavitands.

DETAILED DESCRIPTION OF THE INVENTION

The composition according to the invention advantageously contains also a cross-linking agent selected, for example, from the acrylic or methacrylic esters of diols, triols or polyols, in particular ethylene glycol diacrylate or dimethacrylate; the cross-linking agent can be added to the solution in an amount from 0.1 to 2% by weight referred to the composition.

The acrylic monomer can be selected in principle from methacrylic acid, acrylic acid, methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, glycidyl methacrylate, acrylamide, methacrylamide and mixtures thereof. Preferred monomers are methyl methacrylate, ethyl methacrylate and cyclohexyl methacrylate, preferably in admixture with methacrylic acid; other monomers, which are copolymerizable with the above-cited monomers, are indicated in Italian patent application 19950 A/88 corresponding to European published application 334,378.

As an elastomer it is possible to use chlorosulphonated polyethylene or chlorosulphonated copolymers of ethylene with minor amounts of propylene or of other olefins having 4 to 12 carbon atoms. The chlorosulphonated polyethylene can be obtained, as is known, by reacting straight or branched polyethylene with sulphonyl chloride or with $SO_2$ and chlorine; it is marketed, as is known, under the trade designation "HYPALON". As chlorosulphonated polymers it is possible to use, alternatively, mixtures of sulphonyl chlorides with chlorinated polyethylene. The sulphonyl chlorides can be selected, for example, from alkyl sulphonyl chlorides containing from 1 to 12 carbon atoms (such as methane or butane sulphonyl chloride), aryl sulphonyl chlorides containing from 6 to 24 carbon atoms (such as benzene or toluene sulphonyl chloride) and sulphonyl chlorides containing heteroatoms such as diphenyl-ether-4,4'-disulphonyl chloride.

As a further alternative it is possible to use any other elastomer, either natural or synthetic, which is soluble in the acrylic monomer, for example polybutadiene, butadiene/acrylonitrile polymers, elastomeric polyacrylates, polyisoprene, polychloroprene, polyurethane elastomers or fluorinated elastomers, optionally utilized in admixture with said sulphonyl chlorides. Elastomers suited to this purpose are listed in U.S. Pat. Nos. 4,112,013; 4,182,644; 4,451,615; 4,645,810 and in Italian applications 19950 A/88 and 22141 A/90 corresponding to European published application 487,058. The polymer/monomer ratios can vary over a wide range; a range of 25-500 parts by weight of monomer per 100 parts of polymer is preferred. The sulphonyl chloride, if any, can vary from 0.1 to 5% by mols with respect to the double bond of the acrylic monomer; amounts above 5% can be used without improving, however, the aggregate characteristics of the adhesive system.

As polymerization starters it is possible to use usual free radical generators described for example in "Free Radicals in Solution" by C. Walling, J. Wiley & Sons, New York (1957), and in "The Chemistry of Organic Film Formers" by D. H. Solomon, J. Wiley & Sons, New York, (1967), page 135. The starter amount generally ranges from 0.1 to 2% by weight. If the starter is a peroxide compound, it can be selected from cumene hydroperoxide (CHP); tert. butyl hydroperoxide (T-BHP); normal butyl hydroperoxide (n-BHP); tert.amyl hydroperoxide; methyl ethyl ketone hydroperoxide; cyclohexanone peroxide; 3,5-dimethyl-3,5-dihydroperoxy-1,2-dioxolane; diethyl ketone hydroperoxide; methyl isobutyl ketone hydroperoxide; mixtures thereof, etc.

Preferably cuniene hydroperoxide and/or tert.butyl hydroperoxide should be used. As regards the peracids and the peresters, reference is made to U.S. Pat. No. 4,429,088.

The oxaziridines can be selected from the components described in Italian applications 19950 A/88 and 20579 A/90 corresponding to European published application 460,647; the fluorinated oxaziridines can be selected from the compounds described in U.S. Pat. Nos. 4,874,875 and 4,948,903; excellent results are obtained by using 3,3-pentamethylene-2-cyclohexyl oxaziridine.

The starter activating agent can be selected from a wide range of compounds. A typical example are the condensation products of aldehydes with amines, which products are to be used alone or in admixture with metal salts or other suitable additives as are described in European patent applications Nos. 334,376; 334,377 and 334,378. Particularly advantageous results are obtained by using the condensation products of butyraldehyde with aniline, preferably in admixture with a copper salt, for example copper saccharinate. Said products (known under the initials DHP) are marketed as VANAX 808. The ratio between activating agent and starter can range from 1 to 10.

The starter-stabilizing agents which characterize the invention are now considered. The cyclodextrins (of the alpha, beta or gamma type) are well known macromolecular organic compounds having an inner cavity of non-polar nature, described for example in Hungarian patent 196,578 and by Y. Matsui et al. (Bull. Chem. Soc. Japan; 43; 1909; fiscal year 1970); particularly preferred are the beta cyclodextrins (beta-CD).

The "CALYXARENES" are macromolecular organic compounds, which exhibit a cavity (calyx) limited by aromatic portions of the molecule (aryl moieties); for a more exhaustive definition, reference is to be made for example to U.S. Pat. No. 4,699,966, International patent publication WO 89/08092 and Japanese patent publications 1988/197544 and 1989/007837.

Also the "CAVITANDS" are well known organic compounds characterized by a preorganized lypophilic cavity and they are described for example in Italian application 22522 A/89 and Moran et al, JACS, vol. 184, 1982, pp. 5826-5828.

In the examples given herein, mention is made also of the presence of another "stabilizing agent" (or "antioxidant"), a phenolic compound known as BHT (di-tert-.butyl paracresol).

To avoid possible misunderstandings, the following is pointed out:

cyclodextrins, calyxarenes and cavitands are starter-stabilizing agents, surprisingly capable of housing a peroxide in their respective cavity and of preventing the dangerous thermal decomposition of the starter, without altering at all its valuable characteristics (capability of starting the polymerization) within the adhesive system; this property was observed for the first time by the Applicants;

BHT, conversely, (as well as other analogous stabilizers of the phenolic type, according to European patent publication 334,378) are agents which act chemically by blocking the radicals which form as a consequence of the starter decomposition. The presence or absence of BHT has no effect on the invention.

The cyclodextrins (and the other macrocycles) inhibit the thermal decomposition of a (housed) peroxide up to 150°- 200° C. and above. Furthermore it is possible to keep some of these complexed peroxides, such as cumene hydroperoxide, under a hard vacuum (2 mm Hg) at 56° C. without causing hydroperoxide losses.

The adhesive compositions according to the invention are characterized by an effective radical polymerization redox system, whereby it is possible to obtain:

longer pot lifes, measured as the time during which no viscosity increase exceeding 10% occurs when the samples are subjected to an accelerated curing at 40° C.;

very short setting times measured as the time after which it is not possible to separate two glued test pieces by manually applicating a shear stress; said times usually range from less than 15 seconds to more than 2 minutes;

a higher thermal stability, i.e. no decomposition of the peroxide up to a temperature of 150°-200° C.

The compositions according to the invention can be utilized according to the primer technique, which resides in applying the adhesive component onto a surface and in applicating the activating agent onto the other surface; furthermore they can be utilized not only at room temperature but also at higher temperatures both during setting and during operation. Lastly, the compositions according to the invention can be utilized on porous or smooth surfaces, without necessarily requiring a pretreatment of the surfaces onto which they are to be applied. Materials which can adhere by means of the acrylic adhesives according to the present invention are, for example: steel, aluminium, copper, polymeric materials, wood, glass, paper, prepainted surfaces, etc.

DESCRIPTION OF THE PREFERRED EMBODIMENTS

The following examples are given merely for illustrative purposes and are not to be considered as a limitation of the scope of the invention.

In all the tests, the adhesive systems were prepared keeping the mixtures under stirring at room temperature until all the polymer was completely dissolved. The resulting adhesive systems were characterized by measuring the shear strength according to standard ASTM D 1002-72 (1983) and the setting time. In detail, six simple lap joints were prepared for each adhesive system, using steel test-pieces 120×25×1.5 mm, degreased in trichloroethylene and pickled. Onto a test-piece there was spread a film of adhesive paste having a thickness of about 0.5 mm, and onto the other test-piece there was spread a film of activating agent consisting of DHP (+copper saccharinate); then the two test-pieces were coupled. The lap shear strength (shear stress) was measured by using a MTS 810 apparatus, according to standard ASTM D 1002-72 (1983), maintaining a constant speed of 1 film/minute.

The setting time was measured by using the same glueing method, the same test-pieces to be coupled and the same treatments (as used for preparing the joints utilized for measuring the shear strength) and measuring the minimum setting time necessary to avoid a breaking of the joint under a manually applied shear stress.

EXAMPLE 1 (COMPARATIVE)

34.5 g of ethyl methacrylate were added to a mixture consisting of: 30 g of chlorosulphonated polyethylene (containing 30% by weight of chlorine and known under the trade-name HYPALON 20), 47 millimols of sulphonyl chloride per 100 g of polymer, 33.8 g of methacrylic acid and 1 g of ethylene glycol dimethacrylate. The whole was mixed at room temperature until complete dissolution (after 24 hours) of the whole polymer. The adhesive paste so obtained was completed by adding 0.3 g of di-tert.butyl paracresol (BHT) and 0.4 g of a radical generating agent of the usual type (starter), consisting of cumene hydroperoxide (CHP). The Brookfield viscosity of the paste was equal to 34,000 mPa.s. Then, 120×25×1.5 mm steel test-pieces were prepared, pickling them for 4 minutes in a solution containing 10% by weight of $H_4SO_4$, 10% by weight of $HNO_3$ and 80% by weight of water. A paste film, having a thickness of about 0.5 mm was spread on a test-piece, while on the other test-piece there was spread the activating agent consisting of a butyraldehyde-aniline condensation product (DHP activating agent described in U.S. Pat. No. 3,591,438), containing 0.01% by weight of monovalent copper, introduced as copper saccharinate. The two test-pieces were coupled and compressed at a pressure of about 2 N/m². The lap shear strength was measured by means of an INSTRON TM-SM/10 dynamometer according to standard ASTM D 1002-72 (1983), maintaining a shear speed of 1 mm/minute, after 24 hours at room temperature (+1 hour at 100° C.) starting from the overlapping of the two test-pieces.

The results are reported in Table 1, where also the results of other examples are indicated.

EXAMPLE 2 (COMPARATIVE)

Example 1 was repeated using, instead of CHP, 0.4 g of tert.butyl hydroperoxide (t-BHP); the results, not yet satisfactory as regards the pot life, are reported in Table 1. The Brookfield viscosity of the paste was equal to 36,000 mPa.s.

EXAMPLE 3

Example 1 was repeated but using, instead of the simple starter (CHP), 4 g of a complexed (with beta-cyclodextrin) starter, corresponding to about 0.4% of free CHP. The Brookfield viscosity was equal to 48,000 mPa.s. Data and results are reported in Table 1. Said complexed starter had been previously prepared by the following way:

10 g of beta-cyclodextrin were dissolved in 500 cm³ of deionized water at 45° C.; then, 5 g of CHP were added, maintaining the solution under a constant stirring for about 2 hours. The solution was then cooled in ice and the precipitate was then separated from the mother solution by filtration and then washed with cold water. While the cumene hydroperoxide (not complexed) explodes at about 120° C., the CHP complexed as indicated above was heated for about 5 minutes to 200° C.: no explosive decomposition was observed.

EXAMPLE 4

Example 3 was repeated, using another type of complexed starter, namely 4 g of tert.butyl hydroperoxide complexed with beta-cyclodextrin (corresponding to 0.4% of free t-BHP). Said new complexed starter had been previously prepared following the same procedure of example 3. While the (non-complexed) tertiary butyl hydroperoxide explodes at 109° C., the so complexed T-BHP was heated for about 5 minutes at 200° C. without giving rise to any explosive decomposition phenomenon. Data and results are reported in Table 1. The shear strength was measured also at various curing stages (for all the compositions of examples 1-4) and the curing was carried out on the paste maintaining it at a temperature of 40° C. The results—very meaningful—are reported on Table 2.

TABLE 1

| Ex. | Starter (g) | Setting time (seconds) | Decomposition temperature of the peroxide and complexes | Pot life (days) | Shear strength (N/mm²) | Viscosity (mPa.s) |
|---|---|---|---|---|---|---|
| 1(*) | CHP (0.40 g) | 45 | about 120° C. (**) | 5 | 23.0 | 34,000 |
| 2(*) | t-BHP (0.40 g) | 60 | 109° C. (**) | 7 | 20.1 | 36,000 |
| 3 | CHP + beta CD (4 g) | 45 | higher than 200° C. (***) | 70 | 22.3 | 48,000 |
| 4 | t-BHP + betaCD (4 g) | 60 | higher than 200° C. (***) | 60 | 20.5 | 40,000 |

CHP = cumene hydroperoxide
t-BHP = tert.butyl hydroperoxide
CD = cyclodextrin
(*)comparative example; ()pure peroxide; (*)complexed peroxide.

TABLE 2

| | SHEAR STRENGTH (N/mm²) | | | |
|---|---|---|---|---|
| Example | After 5 days | After 10 days | After 30 days | After 60 days |
| 1(*) | 6.8 | — | — | — |
| 2(*) | — | 8.5 | — | — |
| 3 | — | 21.0 | 18.9 | 16.2 |

TABLE 2-continued

| Example | SHEAR STRENGTH (N/mm²) | | | |
|---|---|---|---|---|
| | After 5 days | After 10 days | After 30 days | After 60 days |
| 4 | — | 20.0 | 18.8 | 17.0 |

(*)Comparative example

EXAMPLE 5 (COMPARATIVE)

40 g of ethyl methacrylate were added to a mixture consisting of 35 g of the chlorosulphonated polyethylene of example 1 , 22.3 g of methacrylic acid, and 1 g of ethylene glycol dimethacrylate. The mixture was blended in a reactor at room temperature until complete dissolution, after 24 hours, of all the polymer. The resulting adhesive paste was completed by adding 0.3 g of di-tert.butyl paracresol (BHT) and 0.4 g of a radical-generating agent (starter) consisting of cumene hydroperoxide (CHP); the Brookfield viscosity of the paste was equal to 80,000 mPa.s. As regards the preparation of the test-pieces and the corresponding tests, reference is to be made to ex.1. Data and results are reported in Table 3.

EXAMPLE 6 (COMPARATIVE)

Example 5 was repeated, using 0.4 g of tert.butyl hydroperoxide (t-BHP) instead of CHP; the results, still very unsatisfactory (as regards the pot life), are reported in Table 3. The Brookfield viscosity was equal to 76,000 mPa.s.

EXAMPLE 7

Example 5 was repeated but using, instead of the simple starter (CHP), 4 g of the corresponding complexed (with beta-cyclodextrin) starter. The Brookfield viscosity was equal to 86,000 mPa.s. Data and results are reported in Table 3. From the comparison with example 3 it results that a variation of the ratio between ethyl methacrylate and methacrylic acid (practically from 1:1 to 2:1 ) and a slight increase of the elastomer amount do not substantially modify the technological characteristics (as to adhesiveness).

EXAMPLE 8

Example 7 was repeated, using another type of complexed starter, namely 4 g of T-BHP complexed with beta-cyclodextrin. The viscosity was equal to 80,000 mPa.s. Data and results are reported in Table 3. The pastes of examples 5-8 were subjected to curing at 50° C.; the results obtained are reported on Table 4.

EXAMPLE 9 (COMPARATIVE)

Example 1 was repeated, using 0.4 g of 3,3-pentamethylene-2-cyclohexyl-oxaziridine instead of CHP; data and results are reported in Table 5.

EXAMPLE 10

Example 3 was repeated using, instead of complex CHP+beta-CD, 4 g of the complex of 3,3-pentamethylene-2-cyclohexyl-oxaziridine with beta-CD. The latter complex had been prepared according to the same modalities described in example 3, but using oxaziridine instead of CHP; data and results are reported in Table 5.

TABLE 3

| Example | Starter (g) | Setting time (seconds) | Pot life (days) | Shear strength (N/mm²) | Viscosity (mPa.s) |
|---|---|---|---|---|---|
| 5(*) | CHP (0.4) | 45 | 8 | 21.5 | 80,000 |
| 6(*) | t-BHP (0.4) | 80 | 8 | 20.2 | 76,000 |
| 7 | CHP + beta CD (4) | 60 | 60 | 21.5 | 86,000 |
| 8 | t-BHP + beta CD (4) | 60 | 50 | 21.3 | 80,000 |

(*)Comparative example

TABLE 4

| Example | SHEAR STRENGTH (N/mm²) | | |
|---|---|---|---|
| | After 10 days | After 30 days | After 60 days |
| 5(*) | 9.2 | — | — |
| 6(*) | 8.2 | — | — |
| 7 | 21.2 | 20.0 | 16.6 |
| 8 | 20.2 | 19.8 | 13.3 |

(*)Comparative example

TABLE 5

| Ex. | Starter (g) | Setting time (seconds) | Decomposition temperature of oxaziridine and complex | Pot life (days) | Shear strength (N/mm²) | Viscosity (mPa.s.) |
|---|---|---|---|---|---|---|
| 9(*) | Oxaz. (0.40 g) | 45 | about 120° C. (**) | 8 | 20.7 | 56,000 |
| 10 | Oxaz. (4 g) | 30 | higher than 200° C. (***) | 60 | 21.1 | 60,000 |

Oxaz. = oxaziridine
CD = cyclodextrin
(*)Comparative example; ()Pure oxaziridine; (*)Complexed oxaziridine.

We claim:

1. A multicomponent adhesive composition comprising:
   (A) an elastomer dissolved in a polyumerizable acrylic monomer;
   (B) a polymerization starter selected from the group consisting of peroxides, peracids, peresters, and oxaziridines;
   (C) a starter activating agent; and
   (D) a cyclodextrin, said polymerization starter being housed within said cyclodextrin.

2. The composition of claim 1, comprising also a cross-linking agent in amounts from 0.1 to 2% by weight calculated on the composition.

3. The composition of claim 1 or 2, wherein the acrylic monomer is selected from the group consisting of methyl methacrylate, ethyl methacrylate, cyclohexyl methacrylate and mixtures thereof with methacrylic acid.

4. The composition of claim 1 or 2, wherein the elastomer is selected form the group consisting of:

chlorosulphonated polyethylene;

chlorosulphonated copolymers of ethylene with minor amounts of propylene or of other olefins having 4 to 10 carbon atoms; and mixtures of sulphonyl chloride with chlorinated polyethylene.

5. The composition of claim 1 or 2, wherein the starter activating agent is a condensation product of an aldehyde with an amide.

6. The composition of claim 1 or 2, wherein the polymerization starter is selected from the group consisting of cumene hydroperoxide, tert.butyl hydroperoxide, 3,3-pentamethylene-2-cyclohexyl-oxaziridine and mixtures thereof.

7. The composition of claim 1 or 2, wherein the cyclodextrin is beta-cyclodextrin.

8. The composition of claim 1 or 2, comprising the also 2,6-ditert.butyl paracresol.

9. The composition of claim 2, wherein the cross-linking agent is selected from the group consisting of acrylic esters of diols, triols and polyols, and methacrylic esters of diols, triols and polyols.

10. The composition of claim 9, wherein the cross-linking agent is an ethylene glycol dicarboxylate.

11. The composition of claim 5, wherein the starter activating agent further comprises a metal salt.

12. The composition of claim 11, wherein the metal salt is copper saccharinate.

13. The composition of claims 1 or 2, wherein the polymerization starter is fluorinated oxaziridine.

14. The composition of claims 1 or 2, wherein the polymerization starter is a hydroperoxide.

15. The composition of claims 1 or 2, wherein the polymerization starter is 3,3-pentamethylene-2-cyclohexyloxaziridine.

16. The composition of claim 9, wherein the cross-linking agent is ethylene glycol dimethacrylate.

* * * * *